March 8, 1960 A. L. GIRARDI 2,927,705
ORCHARD APPARATUS
Filed March 7, 1956 6 Sheets-Sheet 1

INVENTOR.
ANTONIO LAWRENCE GIRARDI
BY
ATTORNEY

FIG. 2

INVENTOR.
ANTONIO LAWRENCE GIRARDI
BY
ATTORNEY

March 8, 1960 — A. L. GIRARDI — 2,927,705
ORCHARD APPARATUS
Filed March 7, 1956 — 6 Sheets-Sheet 3

INVENTOR.
ANTONIO LAWRENCE GIRARDI
BY
ATTORNEY

March 8, 1960     A. L. GIRARDI     2,927,705
ORCHARD APPARATUS Filed March 7, 1956     6 Sheets-Sheet 4

INVENTOR.
ANTONIO LAWRENCE GIRARDI
BY
ATTORNEY

March 8, 1960 A. L. GIRARDI 2,927,705
ORCHARD APPARATUS
Filed March 7, 1956 6 Sheets-Sheet 5

INVENTOR.
ANTONIO LAWRENCE GIRARDI
BY
ATTORNEY

United States Patent Office 2,927,705
Patented Mar. 8, 1960

2,927,705

ORCHARD APPARATUS

Antonio Lawrence Girardi, Stockton, Calif.

Application March 7, 1956, Serial No. 570,165

17 Claims. (Cl. 214—83.1)

This invention relates to mobile apparatus for supporting workmen at desired positions around orchard trees while performing such operations as picking, pruning and spraying.

More particularly, the present invention relates to novel features of construction, arrangement and operation of orchard apparatus of the character described in my copending application, Serial No. 492,433, filed March 7, 1955, now Patent No. 2,798,623.

It is among the objects of the present invention to provide an apparatus adapted to be propelled and operated as a self-contained unit maneuverable between and around rows of orchard trees for supporting workmen in position to perform desired operations simultaneously upon trees on both sides and at both ends of the machine.

It is also an object of my invention to provide an orchard apparatus of the character described wherein a plurality of booms are mounted for independent movement about both vertical and horizontal axes, each boom being axially extensible in any position of angular adjustment about said axes.

Another object is to provide conveying means substantially enclosed within the booms and extensible therewith through the full range of movement of the booms.

A further object is to provide an apparatus having a grading station to which fruit may be continuously conveyed from each of a plurality of platforms, regardless of the position of the platforms relative to adjacent trees.

A further object is to provide an extensible conveying mechanism detachably mounted in association with a boom, and extensible therewith, said conveying mechanism being assembled and mounted as a separable unit.

Another object is to provide a boom of relatively light construction, extensible axially through a wide range of adjustment, and operable to maneuver a platform to desired elevations above or below the level of the carriage on which it is mounted and through a wide angle of horizontal adjustment.

Still further objects include the provision of improved features of construction, assembly, and operation of various parts of the apparatus to facilitate manufacture, simplify operation, and obtain increased efficiency.

The invention has other objects and features of advantage, some of which, with the foregoing, will be hereinafter explained in connection with the illustrative embodiment of the invention shown in the accompanying drawings forming part of the present specification. It is to be understood that the invention is not limited to the structural features shown in the drawings, as the invention may be embodied in other forms, and the structural details may be variously modified, within the scope of the appended claims.

In terms of broad inclusion, the apparatus of the present invention comprises a mobile carriage, preferably self propelled by an engine providing power for operating the moving parts of the apparatus as well as for propelling the carriage. As illustrated, the carriage is provided with four wheel drive and four wheel steering mechanisms of conventional type, the carriage being close coupled to permit the machine to be manipulated around the ends of rows of trees of an orchard. A plurality of booms are mounted upon boom supports, which in turn are mounted on extensible frames movable from retracted positions to extended positions relative to the carriage, for supporting the booms in appropriately spaced relation at the ends of the carriage. Each boom is mounted for independent rotative movement around a vertical axis and for pivotal movement about a horizontal axis arranged to permit the boom to be moved through wide horizontal and vertical angles of adjustment. The booms are extensible axially while in any position within their range of angular adjustment, preferably by mechanism substantially enclosed within the body portions of the booms. Each boom is provided with a conveyor, preferably formed as an independent unit separably mounted within and arranged to be extended with the boom to convey fruit from the outer end of the boom for delivery to a grading table upon the carriage. The invention contemplates hydraulically actuated means for extending and retracting the booms and the conveyors, and for shifting the booms through their ranges of vertical and horizontal angular adjustment.

In terms of greater detail, the apparatus of the present invention comprises a mobile carriage, designated in general by the numeral 16. The carriage comprises a frame designated in general by the numeral 17, mounted upon wheels 18 and provided with a prime mover 19, such as an internal combustion engine, to supply power for propelling the carriage and for operating the apparatus mounted thereon. Preferably, the carriage is equipped with four-wheel drive mechanism 20 and four-wheel steering mechanism 21 of conventional construction, and with appropriate means for controlling the operation thereof. Since the detailed structure of such mechanisms forms no part of the present invention, the drive and steering mechanisms, and the controls therefor, are illustrated only in their general relationship to the apparatus, and not in detail.

Figures 7, 8, 9:
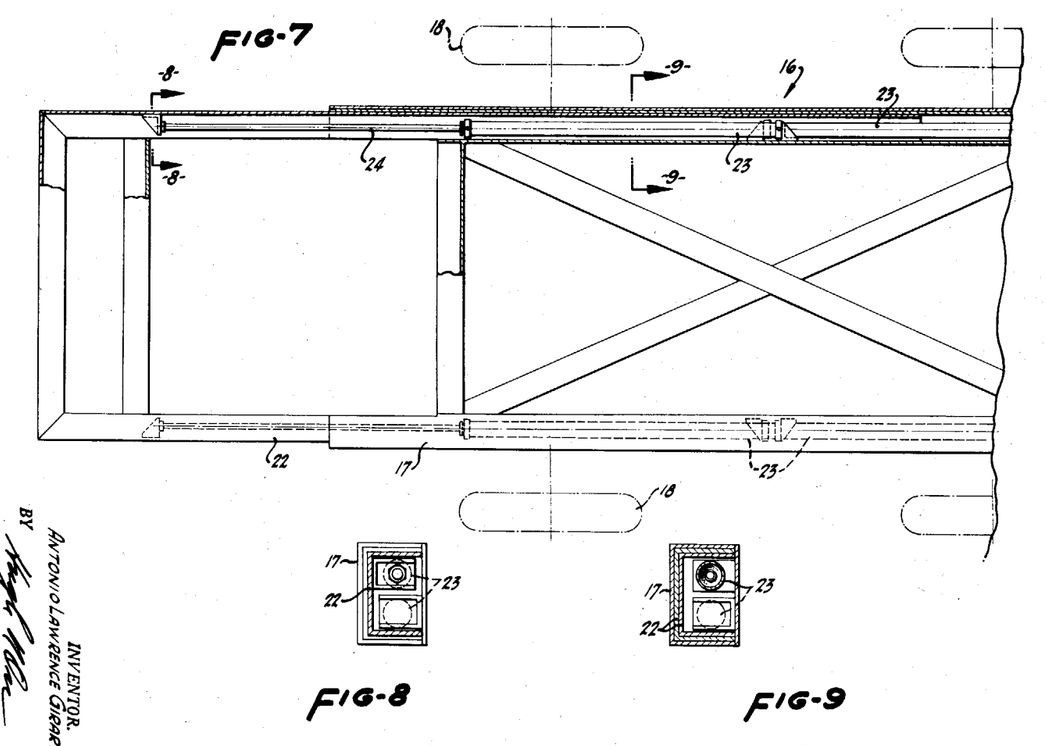
Fig. 7 is a fragmental plan view of the extensible carriage frame, parts being broken away, and parts being shown in section.
Figs. 8 and 9 are sectional detail views of the frame structure, the sections being taken upon the lines 8—8 and 9—9 respectively, of Fig. 7.
Figure 10:
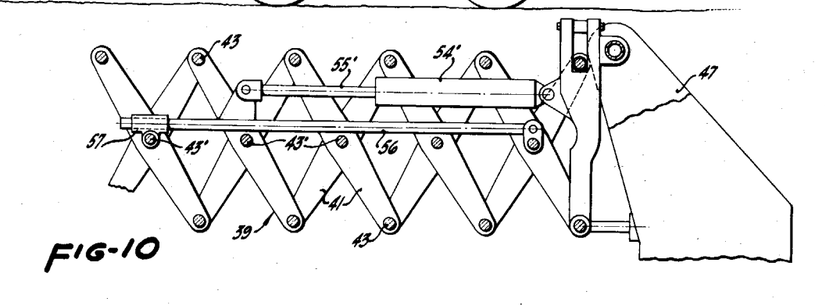
Fig. 10 is a fragmental sectional detail view of the boom shown in Figs. 1 and 3, showing a modified arrangement of the extending means therefor.

The frame 17 comprises a relatively short central section, upon the ends of which are mounted extensible frame sections 22, telescoping with the main central section and with each other. The frame sections 22, when retracted, nest with the center section, and form a compact body frame which may be turned upon a short radius from one aisle to another between adjacent rows of trees. Hydraulic cylinders 23, provided with piston stems 24, are connected and operated in conventional manner to extend and retract the extensible end frame sections relative to the center section, as best illustrated in Figs. 7, 8 and 9 of the drawings.

Boom mounting supports 25 are mounted upon the outer ends of the extensible frame sections 22. Preferably two supports 25 are mounted at each end of the machine, one at each outer corner of each extensible frame section. Each support comprises a hollow body, bolted or otherwise secured at its bottom end to the frame, as at 26, and provided, at its upper end, with a thrust bearing ring 27 bolted or otherwise secured to the flanged top of the support, as at 28. A turntable 29 is supported upon the ring 27 by means of a thrust bearing cage 31 comprising upper and lower race plates 32 and 33. Ball bearings 34 are engaged between the ring 27 and plates 32 and 33. An internal ring gear 36 is bolted or otherwise secured to the cage 31 for engagement by a drive pinion 37, driven by a suitable motor 38, for rotating the cage upon the top of its support. The motor 38 is preferably a reversible electric motor by which the turntable may be turned about the vertical axis of the support, but power may be applied by hydraulic pressure, or otherwise, if desired.

Figure 11:
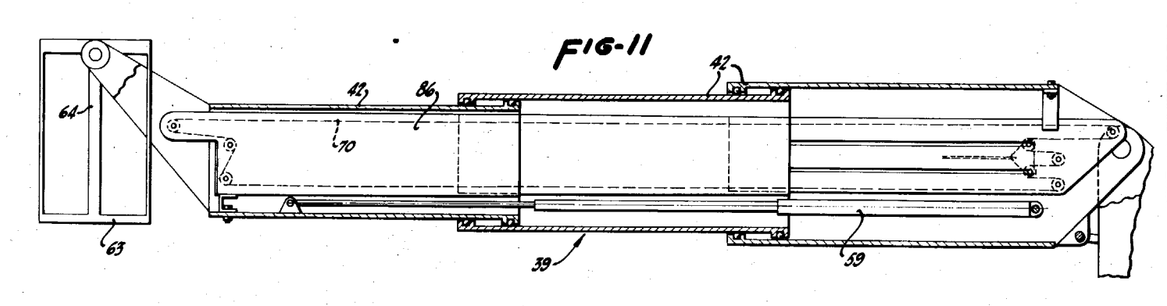
Fig. 11 is a longitudinal sectional view of another form of extensible boom, parts being broken away.
Figure 12:
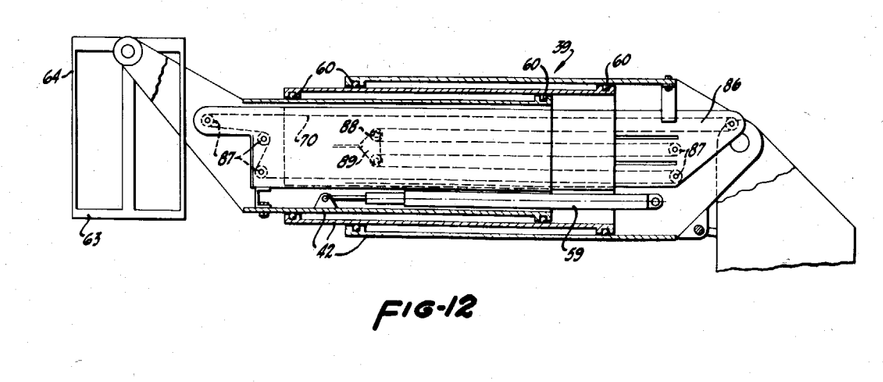
Fig. 12 is a similar sectional view showing the boom, and its conveyor, in retracted position.

An axially extensible boom, designated in general by the numeral 39, is mounted upon the turntable 29 of each support 25 for pivotal movement about a horizontal axis carried by the turntable and revolvable therewith about the vertical axis of the support and turntable. The booms may be constructed of links 41 pivoted together at their ends and at their centers in the manner of lazy tongs, as illustrated in Figs. 1, 2, 3 and 10; or as telescoping sections 42, as illustrated in Figs. 11 and 12.

In the lazy tong type of boom, a plurality of links or levers 41 are pivotally connected to form a pair of lazy tongs joined by cross shafts 43 upon the ends of which adjacent links are pivoted. The shafts 43 are provided with bearing portions 44 upon which the adjacent ends of adjacent links are pivotally connected, and with spacer portions 45 by which the links forming one side of the boom are held in spaced relation to the corersponding links at the opposite side. Similarly, center shafts 43' provide pivot bearings for the center portions of the crossing links at each side of the boom. The cross shafts 43 and 43' with their spacer portions 45 brace the lazy tong links at their end and center pivot points to obtain a rugged structure which will maintain itself in rigid alinement throughout the full range of its extension.

The pairs of links 41 at the inner or base end of each boom are pivotally connected to tilting arms 46 pivotally mounted upon bracket plates 47 extending upwardly from opposite sides of a turntable 29 by means of trunnions 48 journalled in bearings 49 secured to the bracket plates. The downwardly extending link 41 at each side of the boom is pivoted at its lower end to the lower end of the adjacent tilting arm 46 by means of a suitable pivot pin 51. The companion upwardly extending link at each side of each boom is connected at its upper end to the adjacent tilting arm by a pivot pin 52 pivotally and slidably engaged by a slot 53 in the upper end of the tilting arm.

Figure 1:
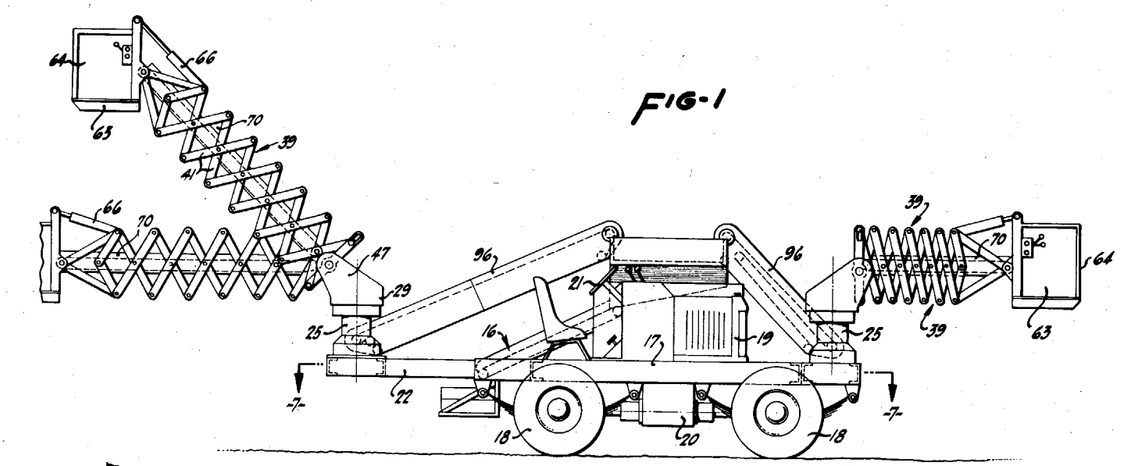
Fig. 1 is a side elevational view of orchard apparatus embodying the present invention.
Figure 2:
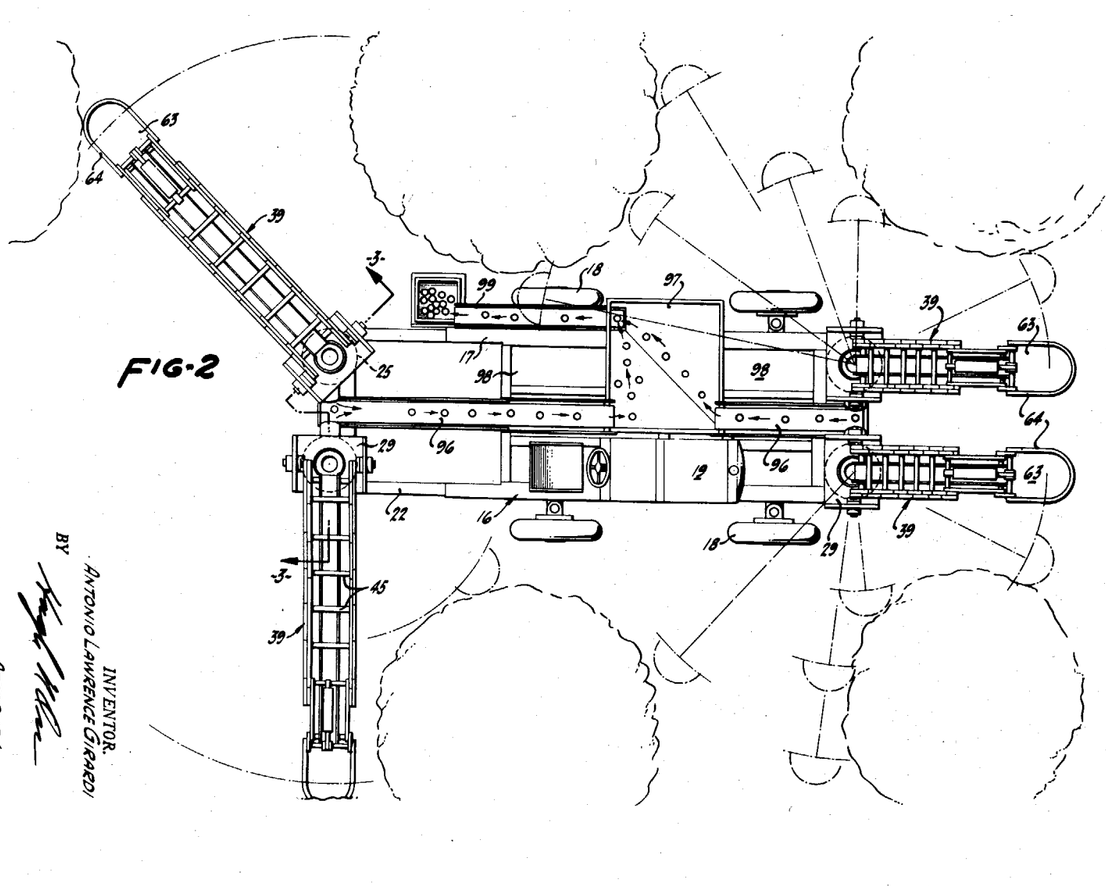
Fig. 2 is a plan view of the apparatus of Fig. 1, the booms being shown in various positions.
Figure 3:
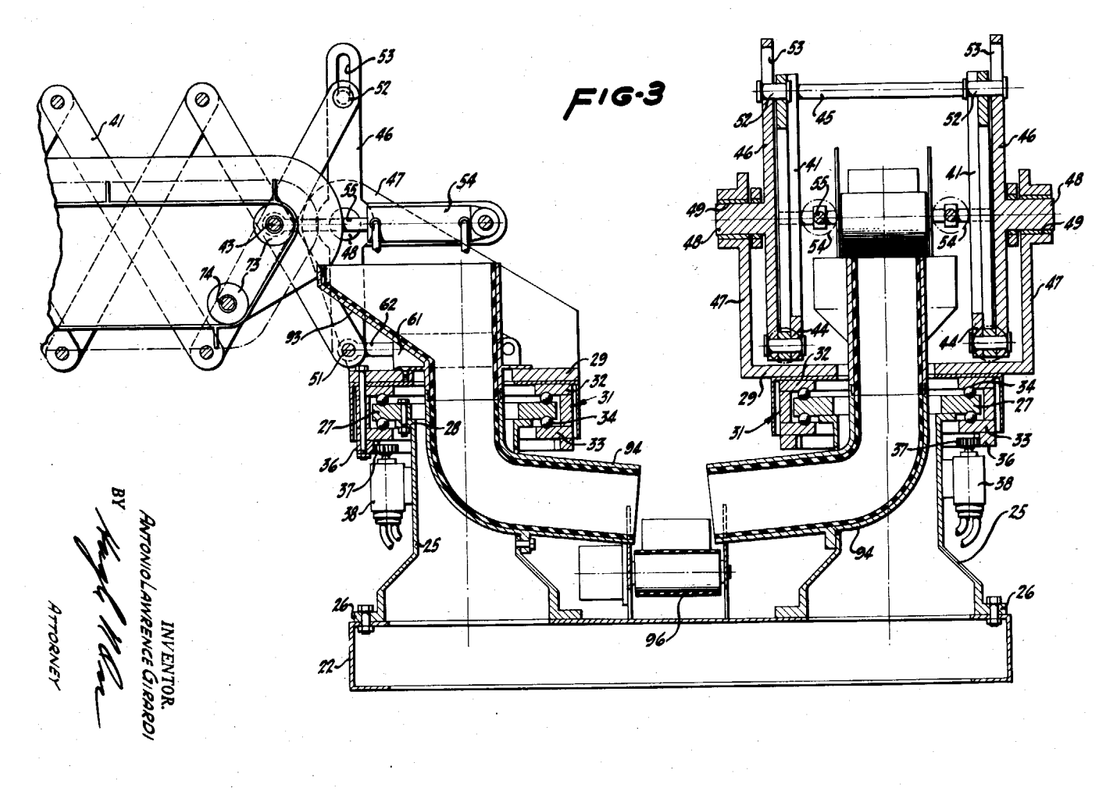
Fig. 3 is a transverse sectional view, the plane of the section being indicated by the line 3—3 of Fig. 2.

Each boom is arranged to be extended and retracted along its longitudinal axis by means of one or more hydraulic cylinders 54 supported by the bracket plates 47. The cylinders 54 are provided with a piston stem 55 connected to one of the center cross shafts 43'. As illustrated in Fig. 3, each piston stem 55 is connected to the rearmost center cross shaft 43', and the cylinder 54 is mounted to extend rearwardly over the boom support. In the form illustrated in Fig. 10, the hydraulic cylinder 54' is mounted to extend forwardly from the boom support; and the piston stem 55' is connected to a center cross shaft near the base of the boom by a rod 56 connected to the shaft at its rearward end and projecting forwardly through a guide 57 secured to a center cross shaft 43' spaced outwardly from the support. The latter arrangement permits the use of a longer hydraulic cylinder, with a longer throw, without obstructing the range of movement of the boom. The top of the guide 57 should be slotted to permit the lug by which the rod 55' is connected to the rod 56 to pass the guide as the boom is moved to and from its retracted position.

In both forms, the hydraulic cylinder actuating means for each boom operates to extend and retract the boom along its axis by force applied to the cross shaft to which it is connected. Outward displacement of the cross shaft causes the links 41 at opposite sides of the boom to be moved in the manner of lazy tongs from the retracted position indicated at the right-hand end of the machine in Fig. 1 of the drawings to an extended position, as indicated at the lefthand end of the machine. Movement of each link 41 is communicated to the next along the length of the boom, the movement being progressively multiplied from the rear to the outer end of the boom. In this manner, a relatively short range of movement of the hydraulic piston stem will extend the outermost end of the boom to a distance in the order of fifteen feet or more.

Instead of the lazy tong construction above described, the booms may be formed of a plurality of hollow telescoping sections 42, preferably of rectangular cross section, as illustrated in Figs. 11 and 12 of the drawings. Roller bearings 60, which may be in the nature of long, thin, needle like rollers, are mounted to extend across the upper and lower surfaces of the telescoping sections to prevent binding and to facilitate the extension and retraction of the booms along their longitudinal axes between retracted positions, such as shown in Fig. 12, and extended positions, such as shown in Fig. 11. The sections of each boom are extended and retracted by a hydraulic cylinder 59. As illustrated, the cylinder 59 is of an extensible telescoping construction having one end secured to the innermost section of the boom and the other end secured to its outermost end. The cylinder extends and retracts as hydraulic pressure is applied in conventional manner to extend and retract the boom. The number of sections may of course be increased to obtain any desired length of boom extension.

Each boom is tilted upon its trunnion 48, to raise and lower the outer end of the boom, by a hydraulic cylinder 61 mounted upon the turntable 29 and connected to the lower end of one or both of the tilting arms 46 upon which the boom is mounted. Each cylinder is provided with a piston stem 62 operable to swing the tilting arms upon their trunnions 48 and thereby swing the boom bodily through a vertical angle, as indicated at the lefthand end of Fig. 1. The bracket plates 47 are extended to overhang the edge of the turntable 29, so that the trunnions may be positioned at a point sufficiently offset to permit the boom to be moved through a wide vertical angle. This permits the outer end of the boom to be elevated from substantially ground level to a position in which the boom approaches the vertical. The cylinder is mounted for pivotal movement relative to the turntable so as to maintain substantial alinement with the pivotal connection of the stem 62 to the tilting arm as the boom is raised and lowered.

A platform 63, preferably provided with side rails or walls 64, is suspended upon the outer end of each boom 39. Each platform is pivoted to the end of its boom at a point sufficiently offset ahead of the boom to permit the platform to swing in a substantially level position through substantially the full range of the vertical angle of movement of the boom. The platform may be mounted to swing freely, with a suitable brake engaging the pivots to hold it against swinging when desired; or a hydraulic cylinder 66 may be provided for applying controlled pressure to move and hold the platform at a desired position relative to the boom.

The boom supports 25 are mounted upon the extensible frame sections 22 which telescope one within the other, and both within the center section, so that either of the sections, or both, may be extended outwardly from the ends of the carriage. The cylinders 23 which actuate the frame sections 22 may be mounted one above the other within the center portion of the frame sections, with their piston stems extending in opposite directions to points of attachment to the extensible frame sections. For transporting the carriage from place to place, and particularly when moving the carriage from row to row of trees in an orchard, the frame sections are retracted to obtain a close coupled carriage capable of movement around the end of one row of trees for operation along the aisles between adjacent rows. For operation along the aisle, the sections are extended to space the supports 25, and the booms carried thereby to conform to the spacing of trees so that workmen on the platforms may be moved to desired positions around trees at both ends of the machine simultaneously.

Figures 4, 5, 6:
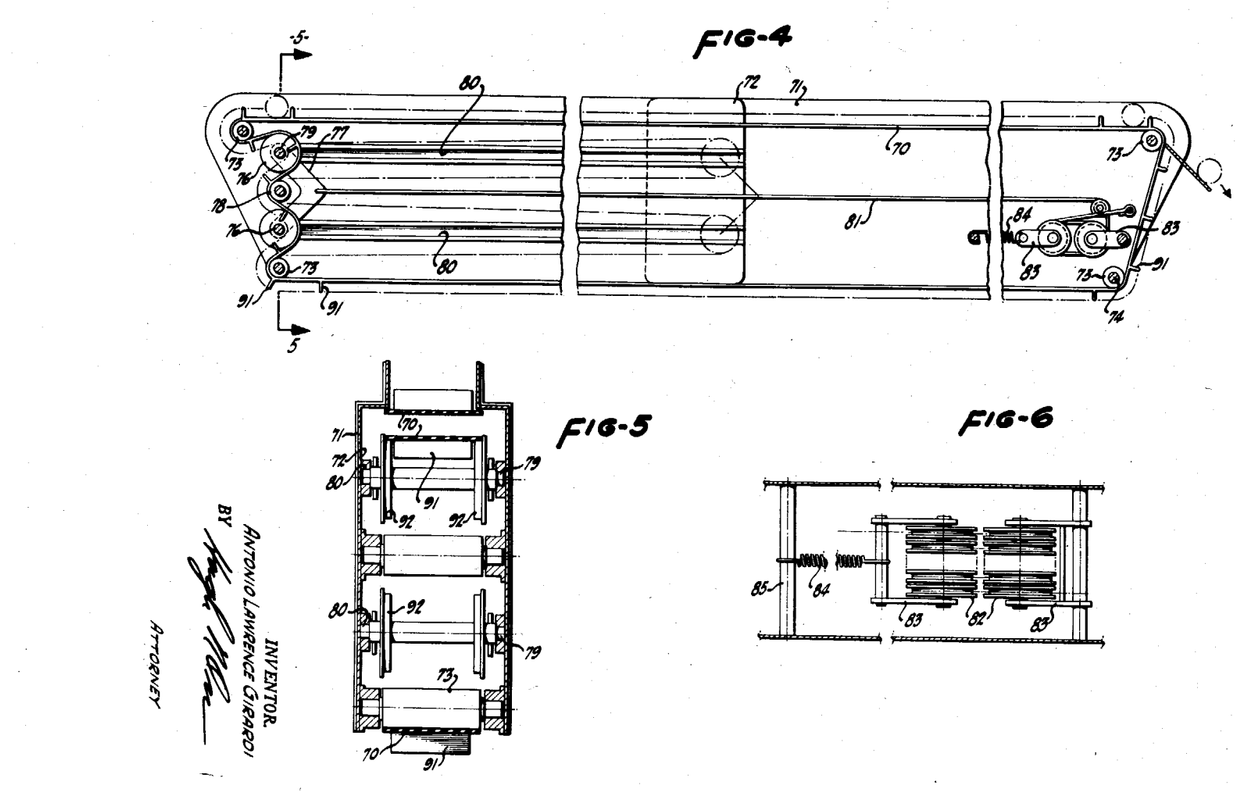
Fig. 4 is a fragmental longitudinal sectional view of one form of the extensible conveying means.
Fig. 5 is a transverse sectional view of the conveying means, the plane of the section being indicated by the line 5—5 of Fig. 4.
Fig. 6 is a fragmental plan view of a portion of the right hand end of the conveying means shown in Fig. 5, parts being broken away.

Each boom 39 is provided with a conveyor 70, substantially enclosed within the body thereof and extensible therewith throughout the range of extension and angular adjustment of the boom. As illustrated in Figs. 4, 5 and 6, the conveyor comprises an endless belt 70 mounted between telescoping side plates 71 and 72 which in turn are mounted within the body of the boom. At the inner or base end of the boom, the conveyor belt passes over a pair of pulleys 73, one of which may be mounted upon the center cross shaft 43' nearest the base of the boom, and the other upon a shaft 74 journalled upon the side plates 71. The positions of the pulleys 73 are substantially fixed with respect to the base of the boom.

At the outer end of the boom, the conveyor belt 70 passes over a pair of pulleys 75 journalled upon the outer ends of the side plates 72 for movement therewith in a direction axially of the boom as it is extended and retracted, said side plates being secured to the outer end portion of the boom so as to be moved to and from extended relation to the plates 71. Between the pulleys 75, the conveyor belt passes over a pair of idler pulleys 76 mounted upon a yoke 77 which is slidably movable lengthwise of the side plates 72. The conveyor also passes over an idler pulley 78 journalled to the side plates 72 in fixed relation to the pulleys 75, about midway between the paths of movement of the pulleys 76, as best shown in Figs. 4 and 5 of the drawings.

The pulleys 76 are journalled upon the yoke 77 by shafts 79, the ends of which engage guide slots 80 in the side plates 72. A flexible cable 81 is attached at its outer end to the yoke 77 and is extended over the sheaves 82 of a pair of pulley blocks 83, and thence to a fixed anchorage near the base of the boom. One of the blocks is attached in relatively fixed position between the plates 72 near their base ends. The other block 83 is attached to one end of a coil spring 84, the other end of which is secured to a shaft 85 extending between the side plates 72 and secured thereto at a point spaced a substantial distance outwardly from the base end of the boom, as indicated in Figs. 4 and 6 of the drawings.

The spring 84 is of sufficient strength to apply tension through the blocks 83 and cable 81, thereby pulling the yoke inwardly for maintaining the belt 70 under tension and for paying out and drawing in loops of the belt to accommodate the extension and retraction of the boom. Thus, when the boom is extended, the plates 72 are moved outwardly to an extended position such as indicated in Fig. 4, the yoke 77 being drawn outwardly to pay out the required length of conveyor belt from loops extending from the center fixed idler pulley 78 over the movable pulleys 76. As the boom is retracted, tension applied by the spring 84 through the cable 81 draws the yoke 77 inwardly to keep the conveyor belt taut, loops being drawn into the boom to take up the belt, as indicated in broken lines in Fig. 4. By passing the cable 81 over a plurality of sheaves in the blocks 83, only a relatively short length of movement of the floating block is necessary to pay out the length of cable necessary to permit movement of the yoke to its extreme outer position shown in Fig. 4. The length of conveyor belt required to reach the outer end of the boom, when extended, is taken up in the loops drawn into the boom as it is retracted. By increasing the number of fixed and movable pulleys, any desired number of loops may be provided to permit any degree of extension.

Figs. 11 and 12 show a modified arrangement of the conveyor which is particularly suited to the telescoping type of boom shown in those figures. In this form, the conveyor is enclosed within a telescoping casing 86 by which the conveyor may be assembled as a separate unit mountable within the boom, and removable bodily therefrom when not required. The conveyor belt 70, indicated in broken lines in the drawings, is passed over fixed pulleys 87 at the ends of the casing sections; and over movable pulleys 88 mounted upon a yoke 89 to which a cable 81 is attached for maintaining tension in the conveyor belt and for forming loops in the belt to accommodate the extension of the boom. The conveyor casing 86 is arranged to be bolted or otherwise secured to the boom sections at the base and outer ends thereof, so as to be extended and retracted with the telescoping boom sections as they are actuated by the hydraulic cylinder 59, which is also enclosed within the boom. The number of pulleys over which the belt is looped, and the number of sheaves over which the take-up cable is passed, may be varied to obtain any required amount of extension.

The conveyor belt is extended at its outer end to the extreme end of the boom with a sufficient length exposed to permit fruit to be placed thereon and carried downwardly through the boom to the carriage. Cleats 91 are preferably provided on the conveyor to prevent fruit from rolling along the conveyor when the boom is raised to a steep angle. To accommodate the cleats, the pulleys over which the cleated face of the belt is moved may be provided with hubs 92 engaging the outer edges of the conveyor belt, the center portions being recessed to permit movement of the cleats therethrough.

At the lower end of each boom, each conveyor 70 extends to a position adjacent a hopper 93 extending outwardly and upwardly from the boom support 25 and communicating with a chute 94 extending downwardly through the support and outwardly through the lower portion of the support, as best shown in Fig. 3. The chutes 94 of the two supports 25 at each end of the carriage are directed toward the center of the machine, and are arranged to direct fruit from the conveyors 70 onto a transfer conveyor 96 extending longitudinally of the carriage to transfer the fruit to a grading table 97 mounted at about the center of the carriage.

The transfer conveyors 96 are of an extensible character and may be constructed similar to those enclosed in the booms, the degree of extension being made sufficient to accommodate the full range of extension of the movable frame sections 22. One end of the conveyor 96 at each end of the carriage is anchored to the center portion of the carriage, and the other end is anchored to the adjacent movable frame section 22 so that the conveyors are automatically extended and retracted with the frame sections.

The conveyors 70 and 96 are independently driven by electric motors or other suitable driving means connected to any of the pulleys over which the conveyors pass. Since such drive means may be mounted and connected in conventional manner, the details thereof would needlessly complicate the drawings and have therefore been omitted.

The grading table 97 is mounted over and to one side of the center carriage section. Platforms 98 are provided at opposite ends of the table to accommodate workmen who may grade fruit as it is conveyed onto the table by the conveyors 96. The graded fruit is directed to one or more conveyors 99 arranged to carry the fruit to a delivery station at one side and toward the rear of the carriage.

In operation, the machine is advanced along the aisles between adjacent rows of orchard trees. Workmen are stationed upon the platforms 63 suspended upon the outer ends of the booms 39. Preferably, the controls for the hydraulic cylinders, motors, or other actuating means for each boom are mounted on or near the guard rails 64 of the platforms, so that each workman may move his boom as required to enable him to shift his position around the adjacent sides of adjacent trees. The controls, of course, are conventional in form and operation, and a detailed description thereof is herein unnecessary. By appropriate tilting of the arms 46, each boom may be raised or lowered from below the level of the carriage to a height approaching the height of the orchard trees. At the same time, the boom may be adjusted through a horizontal angle by rotation of its turntable 29; and the boom, itself, may be extended or retracted along its longitudinal axis to give the workman access to all portions of the adjacent quadrants of adjacent trees. The extensible frame sections 22 are extended to space the base supports of the booms in accordance with the spacing of trees in the orchard. Each workman maneuvers his platform independently of the others, so that each can perform his work without interfering with the operations of the other workmen.

During the picking season, each workman picks the fruit from the portions of adjacent trees accessible to him, as the carriage is advanced from station to station along the aisle. The fruit, as it is picked, is placed on the upper reach of the conveyor by which it is conveyed through the boom to its hopper 93 and chute 94, for transfer to the grading table. The fruit picked by the four workmen passes over the grading table where it is graded. The graded fruit may be placed in lugs stacked in back of the carriage as it progresses through the orchard.

At the ends of the rows, the extensible frame sections are retracted and the booms shifted to positions permitting the carriage to be turned from one aisle to another within the limited space available in the ordinary orchard. Similarly, the sections may be retracted, and the booms shifted to minimize the length of the machine as it is propelled from one point to another.

During pruning or spraying seasons, when the conveyors are not needed, the type of structure illustrated in Figs. 11 and 12 permits the conveyor assemblies to be removed from the booms, thereby decreasing the weight and minimizing the power required to operate the machine.

Having thus described the invention, I claim:

1. In an orchard apparatus of the character described, a boom comprising a plurality of hollow telescoping sections, antifriction bearings between adjacent surfaces of adjacent sections, and means enclosed within the sections for extending and retracting the sections.

2. In an orchard apparatus of the character described, a boom as defined by claim 1 wherein the sections are of rectangular cross section and the antifriction bearings are thin needle like rollers mounted between the upper and lower faces of the telescoping sections.

3. In an orchard apparatus of the character described, a boom mounted for horizontal and vertical angular adjustment, said boom comprising a pair of lazy tongs each comprising a plurality of levers pivotally connected at their ends and centers, cross shafts provided with bearing portions upon their ends, corresponding levers of the lazy tongs being pivoted upon the bearing portions of the cross shafts for connecting and bracing the lazy tongs against relative lateral displacement and permitting extension and retraction thereof as a unit.

4. In an orchard apparatus of the character described, a boom as defined by claim 3 provided with a hydraulic cylinder for extending and retracting the boom, said cylinder being pivotally anchored adjacent the base of the boom and provided with a piston rod having its outer end connected to the links.

5. In an orchard apparatus of the character described, a boom as defined by claim 3 provided with a hydraulic cylinder for extending and retracting the boom, said cylinder being pivotally anchored adjacent the base of the boom and extending into the body thereof, an actuating rod connected to a cross shaft at the base of the boom and extending longitudinally inwardly past a plurality of pairs of levers, a guide slidably engaging the rod at its inner end, and means connecting the hydraulic rod to the rod for applying power thereto at a point within the boom spaced from its base.

6. In an orchard apparatus of the character described, an extensible conveyor substantially enclosed within an axially extensible boom, said conveyor comprising an endless belt extending over pulleys mounted in fixed positions adjacent the ends of the boom and over a pair of movable pulleys engaging the belt at points between the fixed pulleys at one end of the boom, said movable pulleys being mounted upon a loke movable along a path extending longitudinally of the boom, and tensioning means arranged to permit the yoke and movable pulleys to pay out loops of the belt within the boom in conformity with the extension thereof, and to draw in said loops in conformity with the retraction of the boom from an extended position.

7. In an orchard apparatus of the character described, an extensible conveyor as defined by claim 6 wherein the conveyor is assembled within an extensible casing detachably mountable within the boom and removable therefrom as a self-contanied unit.

8. In an orchard apparatus of the character described, an extensible conveyor as defined by claim 6 wherein the yoke tensioning means comprises a spring anchored at one end and connected at the other end to the yoke through the medium of a flexible cable operable over the sheaves of a pair of blocks, one of which is anchored within the body of the boom.

9. In an orchard apparatus of the character described, a boom support comprising a hollow body provided with a hopper opening at its upper end and a chute opening at its lower end, a turntable mounted upon the top of the support, an axially extensible boom mounted upon the turntable for pivotal movement about a horizontal axis supported by the turntable and movable therewith, and conveyor means substantially enclosed within the boom and extensible and retractable by and with the boom for conveying fruit from the outer end thereof to the support for delivery through the hopper and chute openings of the support.

10. An orchard apparatus comprising a mobile carriage, a plurality of boom supports mounted upon the carriage for rotative movement about the vertical axes of said supports, a boom pivotally mounted upon each support for movement about a horizontal pivot axis, each boom comprising a plurality of members movable relative to each other to extend and retract the boom along its longitudinal axis between extended and retracted positions, a platform supported upon the outer end of each boom for movement thereby to desired positions relative to an adjacent tree, power actuated means for shifting each boom angularly about the vertical axis of its support, separately operable power actuated means for moving each boom about the horizontal axis carried by its support, power actuated means for extending and retracting each boom along its longitudinal axis in any position of horizontal and vertical angular adjustment relative to its support, and a conveyor mounted in connection with each boom, each conveyor being longitudinally extensible by and with the boom as it is extended and retracted irrespective of the vertical and horizontal angular adjustment of the boom.

11. An orchard apparatus comprising a mobile carriage, a plurality of boom supports mounted upon the carriage for rotative movement about their vertical axes, a longitudinally extensible boom pivotally anchored at its lower end upon each boom support for angular movement about a horizontal pivot axis carried by the support, a platform supported upon the outer end of each boom for movement to desired positions relative to an adjacent tree, power actuated means for shifting each boom angularly about the vertical axis of its support, separately operable power means for shifting the booms about their horizontal pivot axes upon the supports, means for extending and retracting each boom along its longitudinal axis irrespective of the angular adjustments thereof, and a conveyor substantially enclosed within each boom, each conveyor being extensible and retractable by and with the boom irrespective of the angular adjustments thereof.

12. An orchard apparatus as defined by claim 11 wherein the means for longitudinally extending and retracting each boom comprises a hydraulic ram positioned within the body of the boom.

13. An orchard apparatus comprising a mobile carriage, a plurality of boom supports mounted upon the carriage for rotative movement about their vertical axes, a boom mounted for pivotal movement about a horizontal axis upon each support, each boom comprising a pair of spaced parallel lazy tongs formed of levers pivoted upon and braced by shafts extending transversely between corresponding pivot points of the spaced lazy tongs, a platform supported upon the outer end of each boom for movement thereby to desired positions relative to an adjacent tree, power actuated means for moving the booms about the vertical axes of their respective supports, separate means for moving each boom about its horizontal pivot axis upon its support, and means for extending and retracting each boom along its longitudinal axis.

14. An orchard apparatus comprising a mobile carriage, a plurality of boom supports mounted upon the carriage for rotative movement about vertical axes, a longitudinally extensible boom pivotally anchored at its lower end upon a horizontal pivot axis carried by each support, each boom being constructed and operated in the manner of lazy tongs, each boom comprising a pair of lazy tongs arranged in spaced parallel relation and provided with cross braces interconnecting the corresponding levers of the spaced lazy tongs, said braces having pivot bearings at opposite ends thereof for pivotally connecting adjacent ends of corresponding levers, and a conveyor mounted in association with each boom, each conveyor being substantially enclosed within its boom and being extensible and retractable with the boom irrespective of the position of its angular adjustment relative to the carriage.

15. An orchard apparatus comprising a mobile carriage, a plurality of booms mounted upon the carriage, each boom being pivotally movable through relatively wide angles of horizontal and vertical adjustment and each boom being extensible along its longitudinal axis between extended and retracted positions, platforms mounted upon the outer ends of the booms for supporting workmen at desired positions around adjacent trees, a grading table upon the carriage, and conveying means mounted upon each boom for pivotal and axial movement therewith and operable to convey fruit from the outer end of each boom to the carriage, and means for delivering the fruit onto the grading table.

16. An orchard apparatus comprising a mobile carriage as defined by claim 15 wherein the conveying means comprises endless conveyors mounted for movement within the booms, each conveyor being extensible by and with its boom throughout its range of angular and axial adjustments.

17. An orchard apparatus comprising a mobile carriage, a plurality of boom supports upon the carriage, each support having a hollow body portion and a chute extending through said portion, a boom mounted for horizontal and vertical angular adjustment upon each support, each boom being axially extensible from a retracted position to and from an extended position, a platform mounted upon the outer end of each boom for supporting a workman at a desired position relative to an adjacent tree, a grading table upon the carriage, conveying means upon each boom for delivering fruit from the platform to the chute, and means for directing fruit from the chute onto the grading table.

References Cited in the file of this patent

UNITED STATES PATENTS

| | | |
|---|---|---|
| 1,041,603 | Dearborn | Oct. 15, 1912 |
| 1,423,878 | Potter et al. | July 25, 1922 |
| 2,166,447 | Ruppenthal | July 18, 1939 |
| 2,334,323 | Gilbert | Nov. 16, 1943 |
| 2,450,152 | Miller | Sept. 28, 1948 |
| 2,450,812 | Ray | Oct. 5, 1948 |
| 2,601,092 | Cardiff | June 17, 1952 |
| 2,606,078 | Brock | Aug. 5, 1952 |
| 2,666,417 | Harsch | Jan. 19, 1954 |
| 2,678,125 | Bonney | May 11, 1954 |
| 2,708,998 | Ulinski | May 24, 1955 |
| 2,798,623 | Girardi | July 9, 1957 |